(12) United States Patent
Hong

(10) Patent No.: US 12,082,143 B2
(45) Date of Patent: Sep. 3, 2024

(54) NETWORK REGISTRATION METHOD, APPARATUS, SYSTEM, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 347 days.

(21) Appl. No.: 17/611,520

(22) PCT Filed: May 14, 2019

(86) PCT No.: PCT/CN2019/086843
§ 371 (c)(1),
(2) Date: Nov. 15, 2021

(87) PCT Pub. No.: WO2020/227925
PCT Pub. Date: Nov. 19, 2020

(65) Prior Publication Data
US 2022/0248360 A1 Aug. 4, 2022

(51) Int. Cl.
*H04W 60/00* (2009.01)
*H04W 8/20* (2009.01)
*H04W 12/06* (2021.01)
*H04W 12/45* (2021.01)
*H04W 88/06* (2009.01)

(52) U.S. Cl.
CPC ........... *H04W 60/00* (2013.01); *H04W 8/205* (2013.01); *H04W 12/06* (2013.01); *H04W 12/45* (2021.01); *H04W 88/06* (2013.01)

(58) Field of Classification Search
None
See application file for complete search history.

(56) References Cited

U.S. PATENT DOCUMENTS 9,049,723 B2   6/2015  Dhanda et al.
2011/0223898 A1   9/2011  Noldus
(Continued)

FOREIGN PATENT DOCUMENTS

CN   101296443 A   10/2008
CN   102083200 A   6/2011
(Continued)

OTHER PUBLICATIONS

The Extended European Search Report Issued in Application No. 19929131.1, dated Nov. 18, 2022, (10p).
(Continued)

*Primary Examiner* — Frantz Bataille
(74) *Attorney, Agent, or Firm* — Arch & Lake LLP

(57) ABSTRACT

A method, apparatus, and a non-transitory computer readable storage medium are provided for network registration. The method may be applied to a multi-SIM terminal. The multi-SIM terminal may obtain, when a Subscriber Identification Module (SIM) card of the multi-SIM terminal is registered in a network, one International Mobile Equipment Identity (IMEI), and International Mobile Subscriber Identities (IMSIs) of multiple SIM cards in the multi-SIM terminal. The multi-SIM terminal may send the IMEI and the plurality of IMSIs to a network device. The multi-SIM terminal may receive a verification result fed back by the network device. The first verification result is used for indicating whether the SIM card is allowed to stay in the network.

19 Claims, 8 Drawing Sheets

(56) References Cited

U.S. PATENT DOCUMENTS

| | | | |
|---|---|---|---|
| 2011/0294472 A1* | 12/2011 | Bramwell | H04W 8/04 |
| | | | 455/445 |
| 2014/0341184 A1 | 11/2014 | Dhanda et al. | |
| 2017/0195321 A1* | 7/2017 | He | H04L 63/0853 |
| 2018/0108002 A1 | 4/2018 | Jang et al. | |
| 2018/0220329 A1 | 8/2018 | Arumugam et al. | |
| 2019/0069172 A1 | 2/2019 | Li | |

FOREIGN PATENT DOCUMENTS

| | | |
|---|---|---|
| CN | 102083212 A | 6/2011 |
| CN | 104244227 A | 12/2014 |
| CN | 105210440 A | 12/2015 |
| CN | 109525949 A | 3/2019 |
| GB | 2560899 A | 10/2018 |

OTHER PUBLICATIONS

The First INOA Issued in Application No. 202127057974, dated Sep. 5, 2022, with English Translation, (6p).

3GPP TR 33.899 V1.3.0(Aug. 2017), "3rd Generation Partnership Project; Technical Specification Group Services and System Aspects; Study on the security aspects of the next generation system (Release 14)", (605p).

International Search Report of PCT/CN2019/086843 dated Feb. 11, 2020 with English translation, (4p).

First Office Action issued to Chinese Application No. 201980000855.5 dated Sep. 3, 2021 with English translation, (38p).

* cited by examiner

NETWORK REGISTRATION METHOD, APPARATUS, SYSTEM, AND STORAGE MEDIUM

CROSS-REFERENCE TO RELATED APPLICATION

This application is the U.S. national phase application of PCT Application No. PCT/CN2019/086843, filed May 14, 2019, the entire contents of which are incorporated herein by reference for all purposes.

TECHNICAL FIELD

The present disclosure relates to the field of communication technology, in particular to a network registration method, apparatus, system, and storage medium.

BACKGROUND

A multi-SIM terminal is a terminal where multiple Subscriber Identification Module (SIM) cards can be installed, and the subscriber can choose to use any one of the SIM cards for communication.

Before a subscriber can use a SIM card for communication, the SIM card needs to be registered in the operator's network. In order to ensure that the multi-SIM terminal can be successfully registered in the network, it is usually necessary to apply an International Mobile Equipment Identity (IMEI) for each SIM card. For example, when the multi-SIM terminal is a dual-SIM terminal, two IMEIs need to be applied.

SUMMARY

The present disclosure provides a network registration method, apparatus, system, and storage medium.

In a first aspect of the present disclosure, a method for network registration is provided. The method may include a multi-SIM terminal that obtains, upon registering a Subscriber Identification Module (SIM) card of the multi-SIM terminal to a network, an International Mobile Equipment Identity (IMEI) and multiple International Mobile Subscriber Identities (IMSIs) of multiple SIM cards in the multi-SIM terminal. The multi-SIM terminal may send the IMEI and the multiple IMSIs to a network device in the network. The multi-SIM terminal may receive a authentication result fed back from the network device. The authentication result may be used for indicating whether the SIM card is allowed to reside in the network.

In a second aspect of the present disclosure, a method for network registration is provided. The method may be applied to a network device in a network. The network device may receive an International Mobile Equipment Identity (IMEI) and multiple International Mobile Subscriber Identities (IMSIs) of multiple Subscriber Identification Module (SIM) cards from a multi-SIM terminal. The IMEI and the multiple IMSIs are sent by the multi-SIM terminal upon registering one SIM card to a network. The network device may verify whether the received IMEI and multiple IMSIs are consistent with a mapping relation stored in the network device, and generating a first verification result. The mapping relation may be used for indicating a correspondence between an IMEI and multiple IMSIs, and the first verification result may be used for indicating whether the SIM card is allowed to reside in the network. The network device may determine whether to allow the SIM card to reside in the network based on the first verification result. and the network device may send the first verification result to the multi-SIM terminal.

In a third aspect of the present disclosure, a device is provided. The device may include one or more processors and non-transitory computer-readable memory storing instructions executable by the one or more processors. The one or more processors may be configured to either obtain, upon registering one Subscriber Identification Module (SIM) card of the multi-SIM terminal to a network, an International Mobile Equipment Identity (IMEI) and multiple International Mobile Subscriber Identities (IMSIs) of multiple SIM cards in the multi-SIM terminal. The one or more processors may further be configured to send the IMEI and the multiple IMSIs to a network device in the network. The one or more processors may further be configured to receive a first authentication result fed back from the network device, where the first authentication result is used for indicating whether the SIM card is allowed to reside in the network. The one or more processors may be configured to receive an IMEI and multiple IMSIs of multiple SIM cards from a management device. The IMEI and the multiple IMSIs may be sent by a multi-SIM terminal to the management device upon registering one SIM card to a network. The one or more processors may further be configured to verify whether the received IMEI and multiple IMSIs are consistent with a stored mapping relation and generate a first verification result. The mapping is used for indicating a correspondence between an IMEI and multiple IMSIs. The one or more processors may be configured to send the first verification result to the management device. The first verification result is used for indicating whether the SIM card is allowed to reside in the network

BRIEF DESCRIPTION OF THE DRAWINGS

The accompanying drawings herein are incorporated into and form part of the specification of the present disclosure, illustrate embodiments consistent with the present disclosure, and are used in conjunction with the specification to explain the principles of the present disclosure.

DETAILED DESCRIPTION

Embodiments will be described herein in detail, examples of which are reflected in the accompanying drawings. In the following description, where the accompanying drawings are involved, unless otherwise indicated, the same numerals in the different accompanying drawings denote the same or similar elements. The embodiments described in the following embodiments do not represent all embodiments that are consistent with the present disclosure. Instead, they are only examples of devices and methods that are consistent with some aspects of the present disclosure, as detailed in the appended claims.

Figure 1:
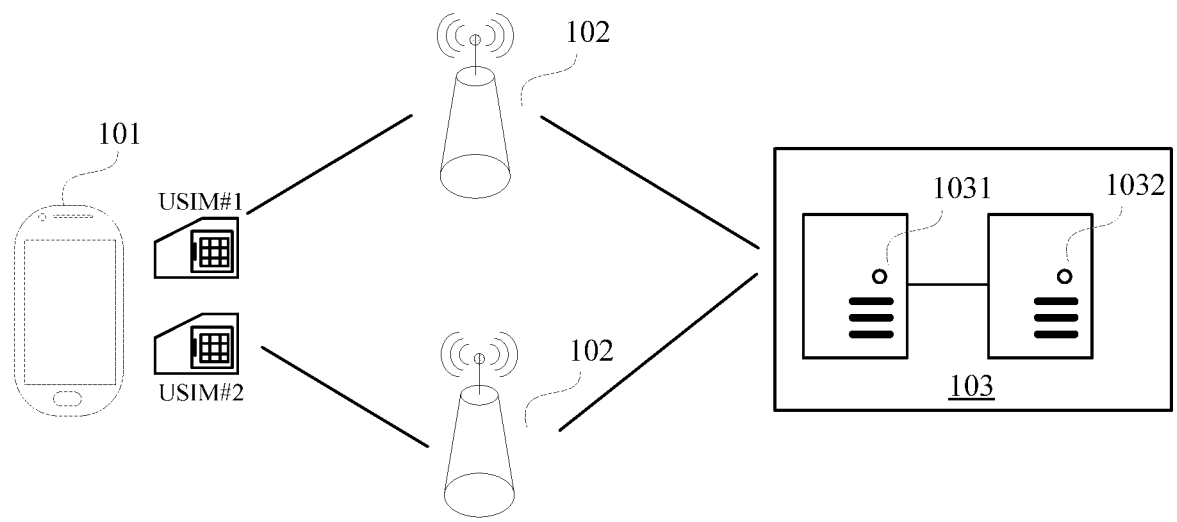
FIG. 1 illustrates a schematic diagram of an implementation environment involved in various embodiments of the present disclosure.

FIG. 1 illustrates a schematic diagram of architecture of a mobile communication system provided in an embodiment of the present disclosure. The mobile communication system may be a 4G system, or a 5G system. The 5G system is also known as a New Radio (NR) system. The mobile communication system includes: a multi-SIM terminal 101, an access network device 102, and a network device 103 which includes a management device 1031 and equipment identify register 1032.

The multi-SIM terminal 101 may refer to a device that provides voice and/or data connectivity to a user. The multi-SIM terminal 101 may communicate with one or more core networks via a Radio Access Network (RAN). The multi-SIM terminal 101 may be a mobile terminal, such as a mobile phone (or "cellular" phone), and a computer providing with a mobile terminal. For example, it may be a portable, pocket-sized, handheld, computer-built-in, or vehicle-mounted mobile device. For example, it may be a Subscriber Unit, Subscriber Station, Mobile Station, Mobile, Remote Station, Access Point, Remote Terminal, Access Terminal, User Terminal, User Agent, User Device, or User Equipment.

A plurality of SIM cards are installed in the multi-SIM terminal 101 and each SIM card is stored with an International Mobile Subscriber Identification Number (IMSI) for distinguishing mobile subscribers. The SIM card referred to here is a card used for registering important data and information of the subscriber, and may be referred to as either a SIM card or a Universal Subscriber Identity Module (USIM), without limitation in these embodiments. The multiple SIM cards belong to a same operator, thus, these SIM cards need to be registered in a same core network.

In the embodiments of the present disclosure, one IMEI can be applied for one multi-SIM terminal 101.

The access network device 102 may be a base station, and the base station is a device deployed in an access network for providing wireless communication functions for the multi-SIM terminal 101. The embodiments of the present disclosure do not limit the specific implementation of the access network device 102. Optionally, the access network device 102 may also include a Home eNB (HeNB), a relay base station, a Pico base station, etc. In systems using different wireless access technologies, the name of the device with base station functionality may vary. For example, in LTE system, it is called eNodeB or eNB; in 5G NR system, it is called gNodeB or gNB. As communication technologies evolve, the name "base station" may change. For the convenience of describing embodiments of the present disclosure, the above-mentioned devices that provide wireless communication functions for terminals are collectively referred to as access network devices.

A wireless connection is established between the multi-SIM terminal 101 and the access network device 102 via a radio air interface. Optionally, the radio air interface is based on a fifth generation mobile communication network technology (5G) standard, or the radio air interface may also be based on 5G-based next generation mobile communication network technology standard.

The management device 1031 is named differently in systems with different radio access technologies. In LTE system, the management device 1031 is called Mobility Management Entity (MME). In 5G NR systems, the management device 1031 is called Access and Mobility Management Function (AMF). The equipment identify register 1032 may be called EIR.

Figure 2:
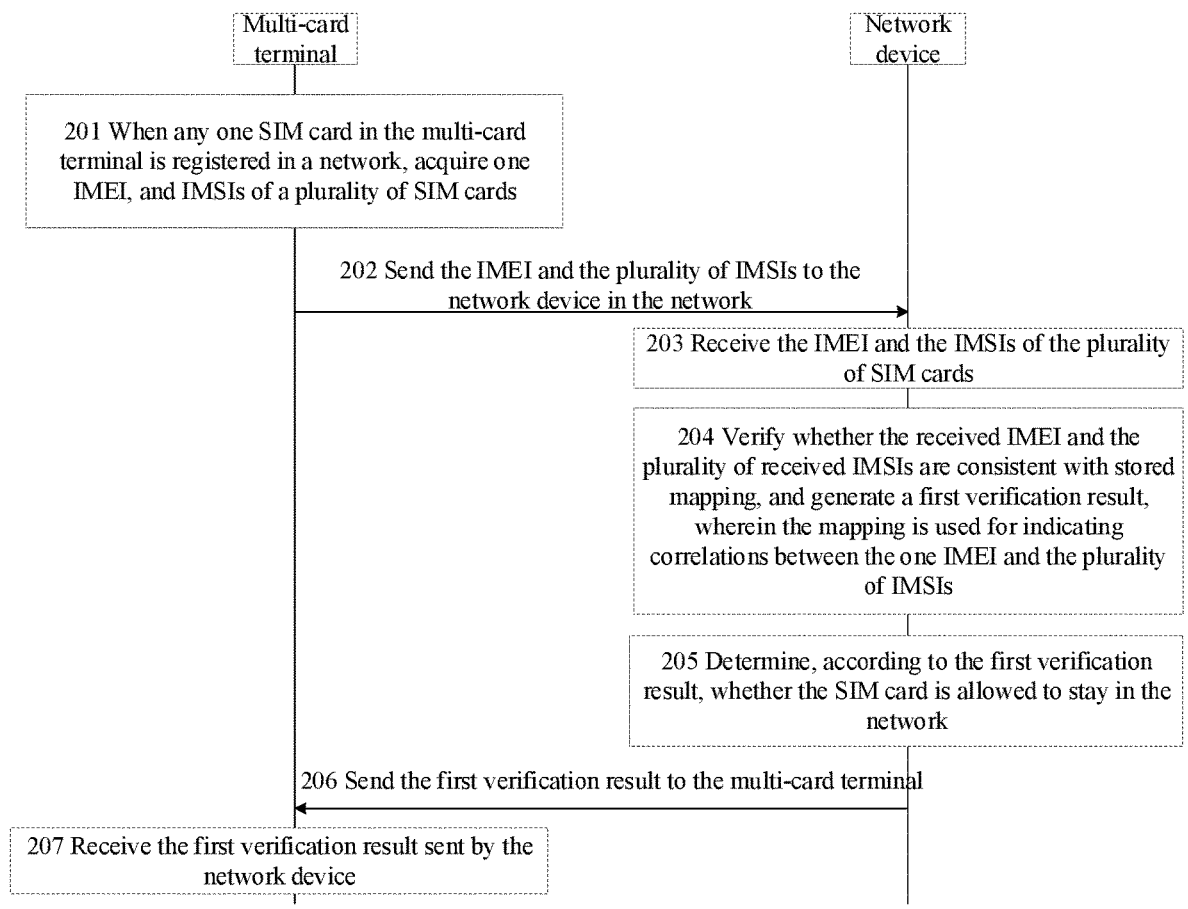
FIG. 2 illustrates a flowchart of a network registration method according to an embodiment.

It should be noted that in the mobile communication system shown in FIG. 2, a network device 103, a plurality of multi-SIM terminals 101 and/or a plurality of access network devices 102 may be included, illustrated in FIG. 1 by showing one network device 103, one multi-SIM terminal 101 and two access network devices 102, and the multi-SIM terminal 101 providing with a USIM card 1 and a USIM card 2, which is not limited in the embodiments.

FIG. 2 illustrates a flowchart of a network registration method according to an embodiment, the network registration method applied in the implementation environment shown in FIG. 1. As shown in FIG. 2, the network registration method includes the following steps.

In step 201, a multi-SIM card terminal obtains an IMEI and multiple IMSIs of multiple SIM cards in the multi-SIM card terminal in response to registering any one of the multiple SIM cards of the multi-SIM terminal to a network.

In step 202, the multi-SIM terminal sends the IMEI and the multiple IMSIs to a network device in the network.

In step 203, the network device receives the IMEI and the IMSIs of the multiple SIM cards from the multi-SIM terminal.

In step 204, the network device verifies whether the received IMEI and the multiple IMSIs are consistent with a mapping relation stored in the network device, and generates a first verification result. The mapping relation is used for indicating a correspondence between an IMEI and multiple IMSIs.

In step 205, the network device determines whether to allow the SIM card to reside in the network based on the first verification result.

In step 206, the network device sends the first verification result to the multi-SIM terminal.

In step 207, the multi-SIM terminal receives the first verification result from the network device.

Here, steps 201 to 202 and 207 may be separately implemented as implementations on the multi-SIM terminal side, and steps 203 to 206 may be separately implemented as implementations on the network device side.

In summary, in the network registration method provided by the present disclosure, since there is a mapping relation stored in the network device and the mapping relation is used for indicate a correspondence between an IMEI and multiple IMSIs, the multi-SIM terminal can obtain the IMSIs of the multiple SIM cards in response to registering any one SIM card to the network, and send one IMEI and the multiple IMSIs to the network device. In this case, the network device can instruct to allow the SIM card to reside in the network when it determines that the received IMEI and multiple IMSIs are consistent with the stored mapping relation, so that when applying one IMEI for the multi-SIM terminal, it can also be guaranteed that the network registration can be successfully performed by the multi-SIM terminal, thereby both preserving the remaining available IMEIs and reducing the costs of the multi-SIM terminal.

In the embodiments, the network device includes a management device and an equipment identify register. The interaction flow between the multi-SIM terminal, the management device, and the equipment identify is described below.

Figure 3:
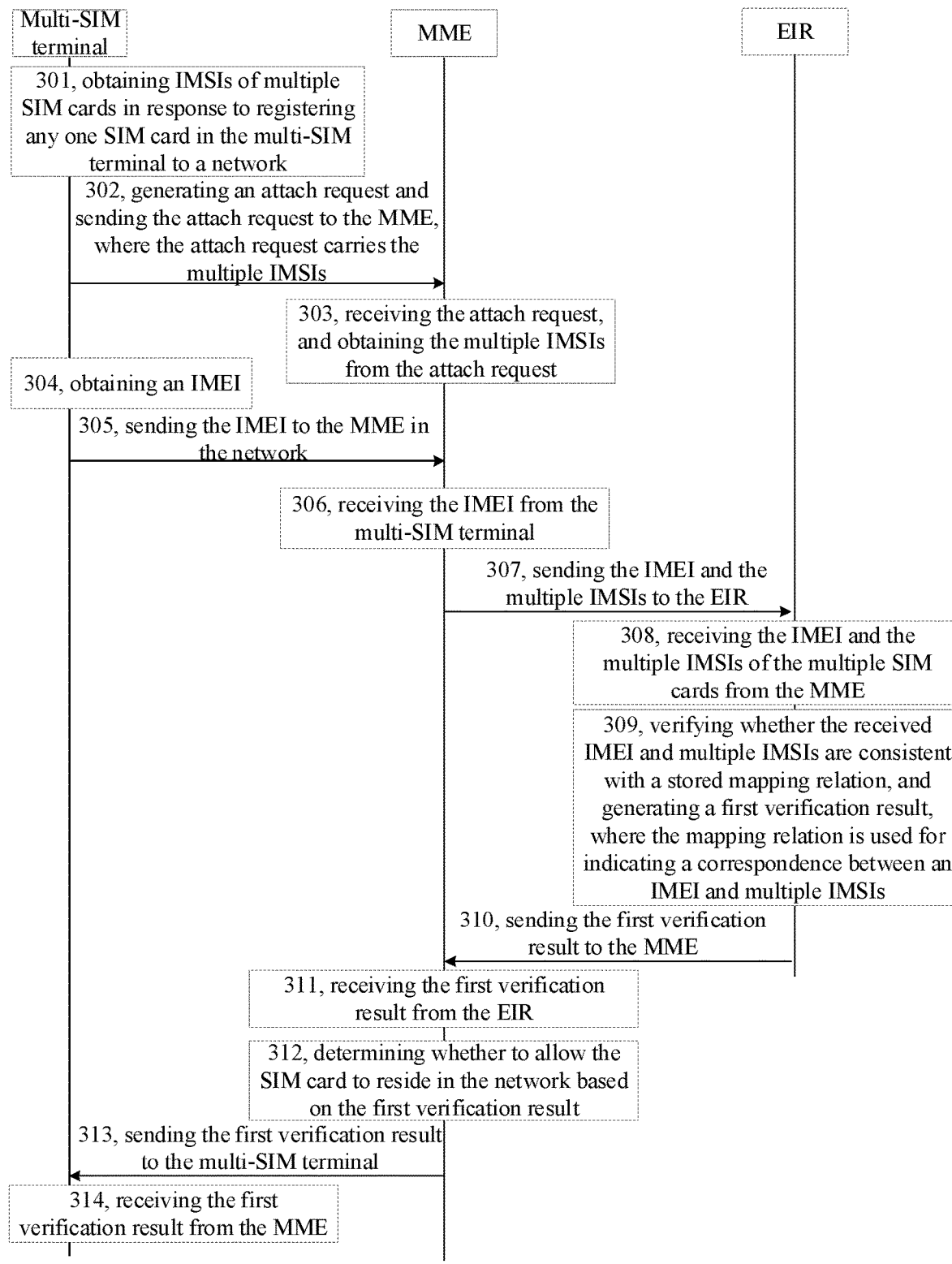
FIG. 3 illustrates a flowchart of a network registration method according to an embodiment illustrated.

FIG. 3 illustrates a flowchart of a network registration method according to another embodiment, which is applied to the implementation environment shown in FIG. 1. In this embodiment, the management device is an MME and the equipment identify register is an EIR. As shown in FIG. 3, the network registration method includes the following steps.

In step 301, a multi-SIM terminal obtains IMSIs of multiple SIM cards in the multi-SIM terminal in response to registering any one SIM card in the multi-SIM terminal to a network.

In this embodiment, the multi-SIM terminal may register SIM cards to the network one by one, and the network is the core network, i.e., the network where the network device 103 shown in FIG. 1 is located.

Since one IMSI is stored in each SIM card, the multi-SIM terminal can read one IMSI from each SIM card and obtain multiple IMSIs.

In step 302, the multi-SIM terminal generates an attach request and sends the attach request to the MME. The attach request carries the multiple IMSIs.

In this embodiment, the multiple SIM cards belong to the same operator and the MME is in one core network corresponding to the operator.

The attach request in this embodiment may be referred to as an Attach Request.

Since multiple IMSIs are carried in the attach request, in order to easily distinguish the IMSI of the SIM card that currently needs to be registered from the IMSIs of other SIM cards, the multi-SIM terminal can distinguish these IMSIs when generating the attach request.

In one possible implementation, the attach request includes a first field and a second field. The first field indicates the IMSI of the currently-registered SIM card and the second field indicates the IMSI of a SIM card other than the currently-registered SIM card.

For example, a multi-SIM terminal includes USIM card 1 and USIM card 2, and USIM card 1 corresponds to IMSI 1 and USIM card 2 corresponds to IMSI 2. Assuming that USIMI card 1 is currently required to be registered, it is possible to carry IMSI 1 in the first field and IMSI 2 in the second field.

After generating the attach request, the multi-SIM terminal can first send the attach request to the access network device, which forwards the attach request to the MME.

In step 303, the MME receives the attach request from the multi-SIM terminal and obtains the multiple IMSIs from the attach request.

When the attach request is forwarded by the access network device to the MME, the MME receives the attach request from the multi-SIM terminal which can be implemented as: the MME receives the attach request forwarded by the access network device.

Here, the MME obtains the multiple IMSIs from the attach request, which may include: the MME reads the first field and the second field from the attach request, and the MME obtains the IMSI of the currently-registered SIM card based on the first field, and obtains the IMSI of a SIM card other than the currently-registered SIM card based on the second field.

Still using the above example for illustration, the MME can obtain the IMSI 1 of the USIM card 1 from the first field and the IMSI 2 of the USIM card 2 from the second field.

In step 304, the multi-SIM terminal obtains an IMEI.

In this embodiment, one IMEI can be applied for one multi-SIM terminal.

In this embodiment, the multi-SIM terminal may obtain the IMEI upon receipt of signaling.

In one embodiment, the signaling may be an identity query request (Identity Request), then this identity query request may be sent by the MME to the multi-SIM terminal, and the multi-SIM terminal obtains the IMEI upon receipt of this identity query request.

In step 305, the multi-SIM terminal sends the IMEI to the MME in the network.

When obtaining the IMEI based on the identity query request, the multi-SIM terminal can generate a response for the identity query (Identity Response) and send the response for the identity query to the MME. The response for the identity query carries the IMEI.

In step 306, the MME receives the IMEI from the multi-SIM terminal.

When the MME receives the response for the identity query, it reads that IMEI from the response for the identity query.

In step 307, the MME sends the IMEI and the multiple IMSIs to the EIR.

In this embodiment, the MME may send the IMEI and the multiple IMSIs to the EIR by carrying them in the signaling.

In one embodiment, the signaling may be a mobile equipment identity check (ME Identity Check), and then the MME may generate the mobile equipment identity check and send it to the EIR. The mobile equipment identity check carries the IMEI and the multiple IMSIs in it.

In step 308, the EIR receives the IMEI and the multiple IMSIs of the multiple SIM cards from the MME.

In one embodiment, the EIR may receive the mobile equipment identity check and read the IMEI and the multiple IMSIs from the mobile equipment identity check.

In step 309, the EIR verifies whether the received IMEI and multiple IMSIs are consistent with the mapping relation store in the network device, and generates a first verification result. The mapping relation is used for indicating a correspondence between an IMEI and multiple IMSIs.

In this embodiment, mapping relations are pre-stored in the EIR, each mapping relation being used for indicating a correspondence between an IMEI and multiple IMSIs. For example, a mapping relation is used for indicating a correspondence between IMSI 1 and IMSI 2, a mapping relation is used for indicating a correspondence between IMEI 2 and IMSI 3 and IMSI 4, etc.

In one embodiment, the EIR may search one mapping relation containing the received IMEI from the respective mapping relations, then read a plurality of IMSIs from the mapping relation, and compare whether the received IMSIs are consistent with the read IMSIs. In case that the received IMSIs are consistent with the read IMSIs, the validation is determined to be successful and the first verification result is generated. In case that the received IMSIs are inconsistent with the read IMSIs, the verification is determined to be failed and the first verification result is generated for indicating that the SIM card is prohibited from residing in the network. Alternatively, the EIR may search a mapping relation containing any of the received IMSIs from the respective mapping relations, and then read an IMEI and the remaining IMSIs from the mapping relation, comparing respectively whether the received IMEI is consistent with the read IMEI, and whether the remaining IMSIs of the received IMSIs are consistent with the remaining IMSIs of the read IMSIs. In case that the received IMEI is consistent with the read IMEI, the remaining IMSIs of the received IMSIs are consistent with the remaining IMSIs of the read IMSIs, the verification is determined to be successful and the first verification result is generated for indicating that the SIM card is allowed to reside in the network; otherwise, the verification is determined to be failed and the first verification result is generated for indicating that the SIM card is prohibited from residing in the network.

Optionally, the EIR may also verify whether the received IMEI is legitimate. In embodiment, a blacklist (or whitelist) is stored in the EIR, and when the received IMEI is not in the blacklist (or in the whitelist), it is determined that the IMEI is legitimate and continues to verify whether the received IMEI and multiple IMSIs are consistent with the stored mapping relation; when the received IMEI is in the blacklist (or not in the whitelist), it is determined that the IMEI is not legitimate and generates the first verification result for indicating that the SIM card is prohibited from residing in the network.

In step 310, the EIR sends the first verification result to the MME.

In this embodiment, the EIR may send the first verification result to the MME by carrying it in the signaling.

In one embodiment, the signaling may be a response for the mobile equipment identity check (ME Identity Check Ack), and then the EIR may generate the response for the mobile equipment identity check, and send it to the MME. The a response for the mobile equipment identity check carries the first verification result in it.

In step 311, the MME receives the first verification result from the EIR.

In one embodiment, the MME may receive the response for the mobile equipment identity check, and read the first verification result from the response for the mobile equipment identity check.

In step 312, the MME determines whether to allow the SIM card to reside in the network based on the first verification result.

When the first verification result is used for indicating that the SIM card is allowed to reside in the network, the MME allows the SIM card to reside in the network, i.e., the registration is successful. When the first verification result is used for indicating that the SIM card is prohibited from residing in the network, the MME prohibits the SIM card from residing in the network, i.e., the registration fails.

In step 313, the MME sends the first verification result to the multi-SIM terminal.

In step 314, the multi-SIM terminal receives the first verification result from the MME.

When the first verification result is used for indicating that the SIM card is allowed to reside in the network, the multi-SIM terminal determines that the SIM card can reside in the network, i.e., the registration is successful. When the first verification result is used for indicating that the SIM card is prohibited from residing in the network, the multi-SIM terminal determines that the SIM card cannot reside in the network, i.e., the registration fails.

Here, steps 301-302, 304-305, and 314 may be separately implemented as implementations on the multi-SIM terminal side; steps 303, 306-307, and 311-313 may be separately implemented as implementations on the MME side; and steps 308-310 may be separately implemented as implementations on the EIR side.

The above embodiments describe the process for non-first-time registration of the SIM card to the network by the multi-SIM terminal, and the process for first-time registration of the SIM card to the network by the multi-SIM terminal is described below.

1. The multi-SIM terminal obtains an IMEI and multiple IMSIs in response to registering any one SIM card in the multi-SIM terminal to the network for the first time.

2. The multi-SIM terminal sends the IMEI and multiple IMSIs to the MME.

3. The MME receives the IMEI and multiple IMSIs from the multi-SIM terminal.

4. The MME sends the IMEI and multiple IMSIs to the EIR.

5. The EIR receives the IMEI and multiple IMSIs from the MME.

The implementation process of steps 1-5 is the same as the implementation process of steps 301-308, and will not be repeated herein.

6. The EIR verifies the IMEI and generates a second verification result.

Since a mapping relation containing one received IMEI and multiple IMSIs is not yet stored in the EIR at the time of first registration, the EIR can verify whether the received IMEI is legitimate and generate the second verification result.

In one embodiment, in the verification of whether the received IMEI is legitimate, since a blacklist (or whitelist) is stored in the EIR, and when the received IMEI is not in the blacklist (or in the whitelist), it is determined that the IMEI is legitimate and the second verification result is generated for indicating that the SIM card is allowed to reside in the network; when the received IMEI is in the blacklist (or not in the whitelist), it is determined that the IMEI is not legitimate and the second verification result is generated for indicating that the SIM card is prohibited from residing in the network.

7. The EIR generates a mapping relation based on the IMEI and multiple IMSIs.

When the received IMEI is legitimate, the EIR may also generate a mapping relation that includes the received IMEI and multiple IMSIs.

8. The EIR sends the second verification result to the MME.

9. The MME receives the second verification result from the EIR.

10. The MME determines whether to allow the SIM card to reside in the network based on the second verification result.

11. The MME sends the second verification result to the multi-SIM terminal.

12. The multi-SIM terminal receives the second verification result from the MME.

The process for implementing steps 8-12 is the same as the process for implementing steps 310-314, and will not be repeated herein.

In summary, in the network registration method provided by the present disclosure, since there is a mapping relation stored in the EIR and the mapping relation is used for indicating a correspondence between an IMEI and multiple IMSIs, the multi-SIM terminal can obtain the IMSIs of the multiple SIM cards in response to registering any one SIM card to the network, and send one IMEI and the multiple IMSIs to the EIR via the MME. In this case, the EIR can instruct the MME to allow the SIM card to reside in the network when it determines that the received IMEI and multiple IMSIs are consistent with the stored mapping relation, so that when applying for one IMEI for the multi-SIM terminal, it can also be guaranteed that the network registration can be successfully performed by the multi-SIM terminal, thereby both preserving the remaining available IMEIs and reducing the costs of the multi-SIM terminal.

The IMSI of the currently-registered SIM card is indicated by the first field of the attach request, and the IMSIs of the remaining SIM cards are indicated by the second field of the attach request, which allows the currently-registered SIM card to be easily distinguished.

Figure 4:
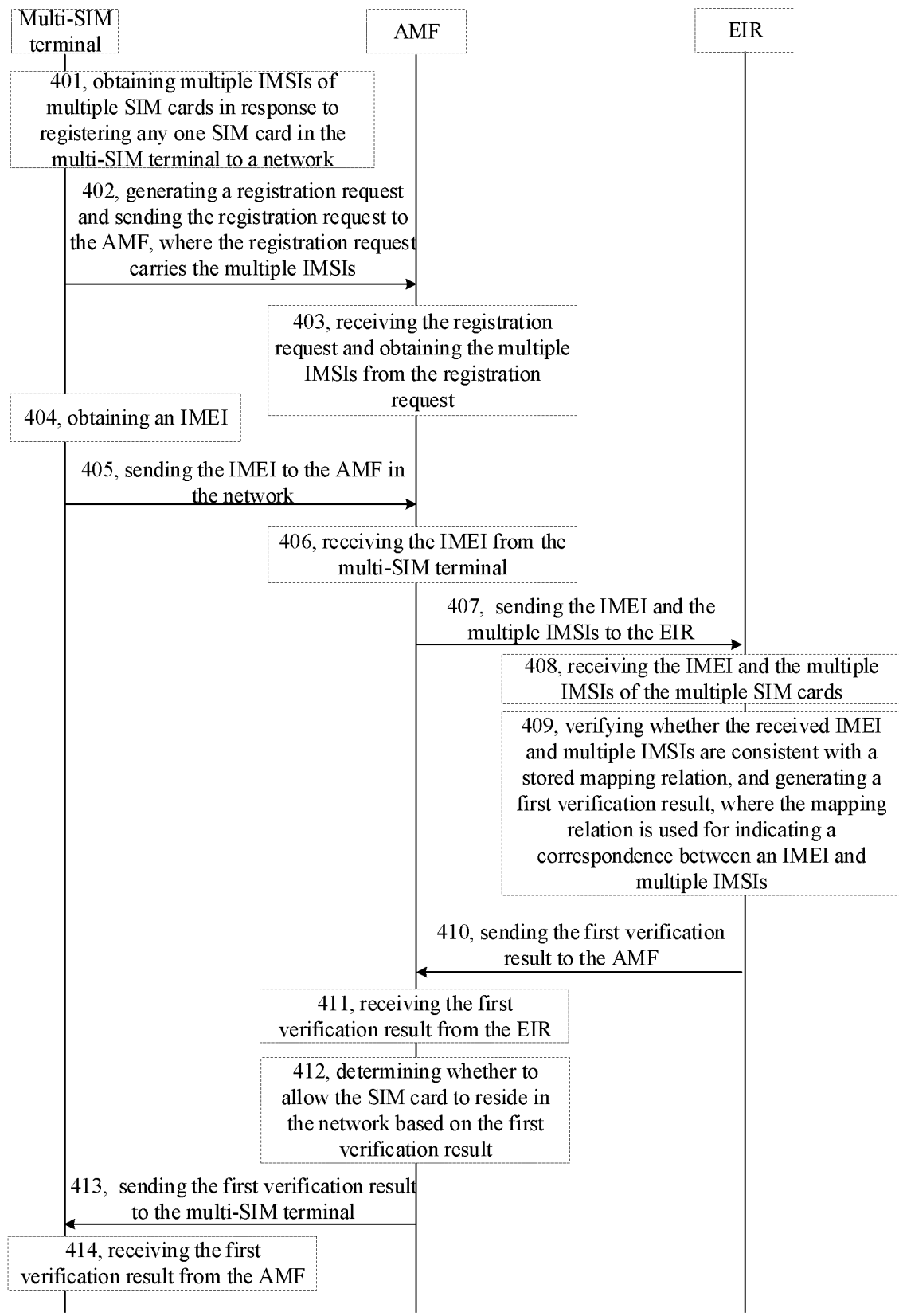
FIG. 4 illustrates a flowchart of a network registration method according to an embodiment.

FIG. 4 illustrates a flowchart of a network registration method according to yet another embodiment, which is applied to the implementation environment shown in FIG. 1. In this embodiment, the management device is an AMF and the equipment identify register is an EIR. As shown in FIG. 4, the network registration method includes the following steps.

In step 401, a multi-SIM card terminal obtains multiple IMSIs of multiple SIM cards in the multi-SIM card terminal in response to registering any one SIM card in the multi-SIM terminal to a network.

In this embodiment, the multi-SIM terminal may register SIM cards to the network one by one, and the network is the core network, i.e., the network where the network device 103 shown in FIG. 1 is located.

Since one IMSI is stored in each SIM card, the multi-SIM terminal can read one IMSI from each SIM card and obtain multiple IMSIs.

In step 402, the multi-SIM terminal generates a registration request and sends the registration request to the AMF. The registration request carries the multiple IMSIs.

In this embodiment, the multiple SIM cards belong to the same operator and the AMF is in one core network corresponding to the operator.

The registration request in this embodiment may be referred to as a Registration Request.

Since multiple IMSIs are carried in the registration request, in order to easily distinguish the IMSI of the SIM card that currently needs to be registered from the IMSIs of other SIM cards, the multi-SIM terminal can distinguish these IMSIs when generating the registration request.

In one possible implementation, the registration request includes a third field and a fourth field. The third field indicates the IMSI of the currently-registered SIM card and the fourth field indicates the IMSI of a SIM card other than the currently-registered SIM card.

For example, a multi-SIM terminal includes USIM card 1 and USIM card 2, and USIM card 1 corresponds to IMSI 1 and USIM card 2 corresponds to IMSI 2. Assuming that USIMI card 1 is currently required to be registered, it is possible to carry IMSI 1 in the third field and IMSI 2 in the fourth field.

After generating the registration request, the multi-SIM terminal can first send the registration request to the access network device, which forwards the registration request to the AMF.

In step 403, the AMF receives the registration request from the multi-SIM terminal and obtains the multiple IMSIs from the registration request.

When the registration request is forwarded by the access network device to the AMF, the AMF receives the registration request from the multi-SIM terminal which can be implemented as: the AMF receives the registration request forwarded by the access network device.

Here, the AMF obtains the multiple IMSIs from the registration request, which may include: the AMF reads the third field and the fourth field from the registration request, and the AMF obtains the IMSI of the currently-registered SIM card based on the third field, and obtains the IMSI of a SIM card other than the currently-registered SIM card based on the fourth field.

Still using the above example for illustration, the AMF can obtain the IMSI 1 of the USIM card 1 from the third field and the IMSI 2 of the USIM card 2 from the fourth field.

In step 404, the multi-SIM terminal obtains an IMEI.

In this embodiment, one IMEI can be applied for one multi-SIM terminal.

In this embodiment, the multi-SIM terminal may obtain the IMEI upon receipt of signaling.

In one embodiment, the signaling may be an identity query request (Identity Request), then this identity query request may be sent by the AMF to the multi-SIM terminal, and the multi-SIM terminal obtains the IMEI upon receipt of this identity query request.

In step 405, the multi-SIM terminal sends the IMEI to the AMF in the network.

When obtaining the IMEI based on the identity query request, the multi-SIM terminal can generate a response for the identity query (Identity Response) and send the response for the identity query to the AMF. The response for the identity query carries the IMEI.

In step 406, the AMF receives the IMEI from the multi-SIM terminal.

When the AMF receives the response for the identity query, it reads that IMEI from the response for the identity query.

In step 407, the AMF sends the IMEI and the multiple IMSIs to the EIR.

In this embodiment, the AMF may send the IMEI and the multiple IMSIs to the EIR by carrying them in the signaling.

In one embodiment, the signaling may be a mobile equipment identity check (ME Identity Check), and then the AMF may generate the Mobile Equipment Identity Check and send it to the EIR. The mobile equipment identity check carries the IMEI and the multiple IMSIs in it.

In step 408, the EIR receives the IMEI and the multiple IMSIs of the multiple SIM cards from the AMF.

In one embodiment, the EIR may receive the mobile equipment identity check and read the IMEI and the multiple IMSIs from the mobile equipment identity check.

In step 409, the EIR verifies whether the received IMEI and multiple IMSIs are consistent with the mapping relation store in the network device, and generates a first verification result. The mapping relation is used for indicating a correspondence between an IMEI and multiple IMSIs.

The process for implementing step 409 is the same as the process for implementing step 309, and will not be repeated herein.

In step 410, the EIR sends the first verification result to the AMF.

In this embodiment, the EIR may send the first verification result to the AMF by carrying it in the signaling.

In one embodiment, the signaling may be a response for the mobile equipment identity check (ME Identity Check Ack), and then the EIR may generate the response for the mobile equipment identity check, and send it to the AMF. The response for the mobile equipment identity check carries the first verification result in it.

In step 411, the AMF receives the first verification result from the EIR.

In one embodiment, the AMF may receive the response for the mobile equipment identity check, and read the first verification result from the response for the mobile equipment identity check.

In step 412, the AMF determines whether to allow the SIM card to reside in the network based on the first verification result.

When the first verification result is used for indicating that the SIM card is allowed to reside in the network, the AMF allows the SIM card to reside in the network, i.e., the registration is successful. When the first verification result is used for indicating that the SIM card is prohibited from residing in the network, the AMF prohibits the SIM card from residing in the network, i.e., the registration fails.

In step 413, the AMF sends the first verification result to the multi-SIM terminal.

In step 414, the multi-SIM terminal receives the first verification result from the AMF.

When the first verification result is used for indicating that the SIM card is allowed to reside in the network, the multi-SIM terminal determines that the SIM card can reside in the network, i.e., the registration is successful. When the first verification result is used for indicating that the SIM card is prohibited from residing in the network, the multi-SIM terminal determines that the SIM card cannot reside in the network, i.e., the registration fails.

Here, steps 401-402, 404-405, and 414 may be separately implemented as implementations on the multi-SIM terminal side; steps 403, 406-407, and 411-413 may be separately implemented as implementations on the AMF side; and steps 408-410 may be separately implemented as implementations on the EIR side.

The above embodiments describe the process for non-first-time registration of the SIM card to the network by the multi-SIM terminal, and the process for first-time registration of the SIM card to the network by the multi-SIM terminal is described below.

In particular, the process for registering any one SIM card in the multi-SIM terminal for the first time is as follows.

1. The multi-SIM terminal obtains an IMEI and multiple IMSIs in response to registering any one SIM card in the multi-SIM terminal to the network for the first time.

2. The multi-SIM terminal sends the IMEI and multiple IMSIs to the AMF.

3. The AMF receives the IMEI and multiple IMSIs from the multi-SIM terminal.

4. The AMF sends the IMEI and multiple IMSIs to the EIR.

5. The EIR receives the IMEI and multiple IMSIs from the AMF.

The implementation process of steps 1-5 is the same as the implementation process of steps 401-408, and will not be repeated herein.

6. The EIR verifies the IMEI and generates a second verification result.

In this regard, the process for EIR verification of IMEI is the same as the process for implementing step 6 in the embodiment shown in FIG. 3, and will not be repeated herein.

7. The EIR generates a mapping relation based on the IMEI and multiple IMSIs.

When the received IMEI is legitimate, the EIR may also generate a mapping relation that includes the received IMEI and multiple IMSIs.

8. The EIR sends the second verification result to the AMF.

9. The AMF receives the second verification result from the EIR.

10. The AMF determines whether to allow the SIM card to reside in the network based on the second verification result.

11. The AMF sends the second verification result to the multi-SIM terminal.

12. The multi-SIM terminal receives the second verification result from the AMF.

The process for implementing steps 8-12 is the same as the process for implementing steps 410-414, and will not be repeated herein.

In summary, in the network registration method provided by the present disclosure, since there is a mapping relation stored in the EIR and the mapping relation is used for indicating a correspondence between an IMEI and multiple IMSIs, the multi-SIM terminal can obtain the IMSIs of the multiple SIM cards in response to registering any one SIM card to the network, and send one IMEI and the multiple IMSIs to the EIR via the AMF. In this case, the EIR can instruct the AMF to allow the SIM card to reside in the network when it determines that the received IMEI and multiple IMSIs are consistent with the stored mapping relation, so that when applying for one IMEI for the multi-SIM terminal, it can also be guaranteed that the network registration can be successfully performed by the multi-SIM terminal, thereby both preserving the remaining available IMEIs and reducing the costs of the multi-SIM terminal.

The IMSI of the currently-registered SIM card is indicated by the third field of the registration request, and the IMSIs of the remaining SIM cards are indicated by the fourth field of the registration request, which allows the currently-registered SIM card to be easily distinguished.

Figure 5:
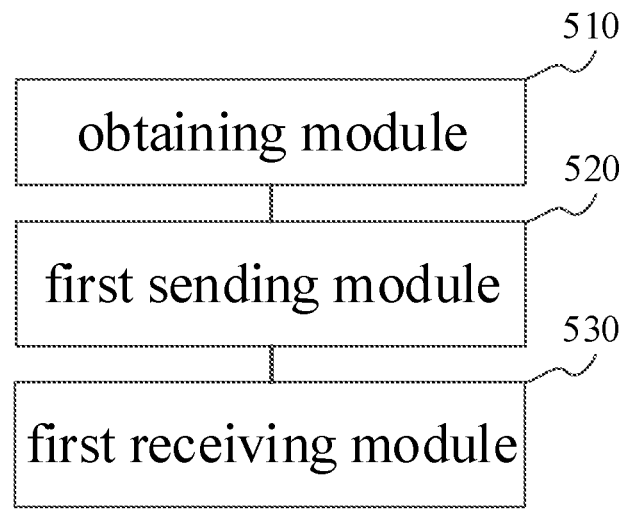
FIG. 5 illustrates a block diagram of a network registration apparatus according to an embodiment.

FIG. 5 illustrates a block diagram of a network registration apparatus according to an embodiment, the network registration apparatus being applied in the multi-SIM terminal 101 shown in FIG. 1. As shown in FIG. 5, the network registration apparatus includes: an obtaining module 510, a first sending module 520, and a first receiving module 530.

The obtaining module 510 is configured to obtain, upon registering one SIM card of the multi-SIM terminal to a network, an IMEI and multiple IMSIs of multiple SIM cards in the multi-SIM terminal.

The first sending module 520 is configured to send the IMEI and the multiple IMSIs to a network device in the network.

The first receiving module 530 is configured to receive a first authentication result fed back from the network device, where the first authentication result is used for indicating whether the SIM card is allowed to reside in the network.

In one possible implementation, the network device includes a management device, and the management device is a MME, and the first sending module 520 is further configured to: generate an attach request, where the attach request carries the multiple IMSIs; and send the attach request to the management device.

In one possible implementation, the attach request includes a first field and a second field, the first field indicates the IMSI of currently-registered SIM card, and the second field indicates the IMSI of a SIM card other than the currently-registered SIM card.

In one possible implementation, the network device includes a management device, and the management device is an AMF, and the first sending module 520 is further configured to: generate a registration request, where the registration request carries the multiple IMSIs; and send the registration request to the management device.

In one possible implementation, the registration request includes a third field and a fourth field, the third field indicates the IMSI of currently-registered SIM card, and the fourth field indicates the IMSI of a SIM card other than the currently-registered SIM card.

In one possible implementation, the obtaining module 510 is further configured to obtain, upon first registering the SIM card of the multi-SIM terminal to the network, the IMEI and the multiple IMSIs;

the first sending module 520 is further configured to send the IMEI and the multiple IMSIs to the network device; and the first receiving module 530 is further configured to receive a second authentication result fed back from the network device, where the second authentication result is used for indicating whether the SIM card is allowed to reside in the network.

In summary, in the network registration apparatus provided by the present disclosure, since there is a mapping relation stored in the network device and the mapping relation is used for indicating a correspondence between an IMEI and multiple IMSIs, the multi-SIM terminal can obtain the IMSIs of the multiple SIM cards in response to registering any one SIM card to the network, and send one IMEI and the multiple IMSIs to the network device. In this case, the network device can instruct to allow the SIM card to reside in the network when it determines that the received IMEI and multiple IMSIs are consistent with the stored mapping relation, so that when applying for one IMEI for the multi-SIM terminal, it can also be guaranteed that the network registration can be successfully performed by the multi-SIM terminal, thereby both preserving the remaining available IMEIs and reducing the costs of the multi-SIM terminal.

The IMSI of the currently-registered SIM card is indicated by the first field of the attach request, and the IMSIs of the remaining SIM cards are indicated by the second field of the attach request, which allows the currently-registered SIM card to be easily distinguished.

Figure 6:
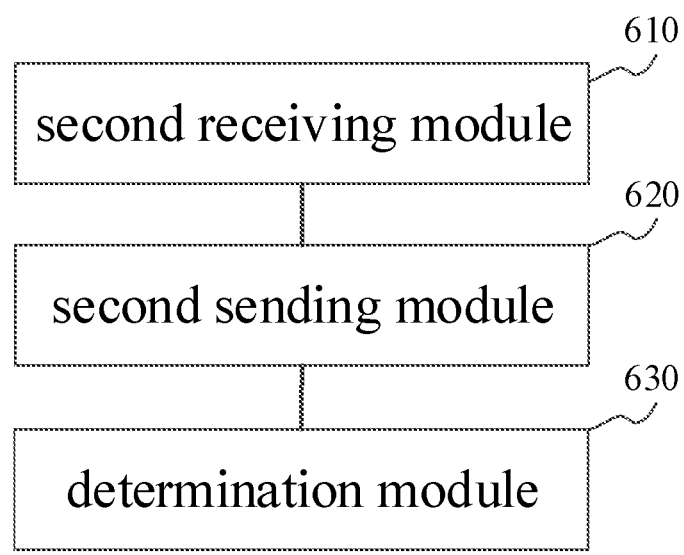
FIG. 6 illustrates a block diagram of a network registration apparatus according to an embodiment.

FIG. 6 illustrates a block diagram of a network registration apparatus according to an embodiment, the network registration apparatus being applied in the management device 103 shown in FIG. 1. As shown in FIG. 6, the network registration apparatus includes: a second receiving module 610, a second sending module 620, and a determination module 630.

The second receiving module 610 is configured to receive an IMEI and multiple IMSIs of multiple SIM cards from a multi-SIM terminal, where the IMEI and the multiple IMSIs are sent by the multi-SIM terminal upon registering one SIM card to a network.

The second sending module 620 is configured to send the IMEI and the multiple IMSIs to an equipment identify register.

The second receiving module 610 is further configured to receive a first verification result from the equipment identify register, the first verification result is generated by the equipment identify register after verifying whether the IMEI and the multiple IMSIs are consistent with a stored mapping relation, and the mapping relation is used for indicating a correspondence between an IMEI and multiple IMSIs.

The determination module 630 is configured to determine whether to allow the SIM card to reside in the network based on the first verification result.

The second sending module 620 is further configured to send the first verification result to the multi-SIM terminal.

In one possible implementation, the management device is a MME, and the second receiving module 610 is further configured to:

receive an attach request from the multi-SIM terminal; and obtain the multiple IMSIs from the attach request.

In one possible implementation, the second receiving module 610 is further configured to:

read a first field and a second field from the attach request;

obtain the IMSI of currently-registered SIM card based on the first field, and obtain the IMSI of a SIM card other than the currently-registered SIM card based on the second field.

In one possible implementation, the management device is an AMF, and the second receiving module 610 is further configured to:

receive a registration request from the multi-SIM terminal; and obtain the multiple IMSIs from the registration request.

In one possible implementation, the second receiving module 610 is further configured to:

read a third field and a fourth field from the registration request; and obtain the IMSI of currently-registered SIM card based on the third field, and obtain the IMSI of a SIM card other than the currently-registered SIM card based on the fourth field.

In one possible implementation, the second receiving module 610 is further configured to receive the IMEI and the multiple IMSIs from the multi-SIM terminal, where the IMEI and the multiple IMSIs are sent by the multi-SIM terminal upon first registering the SIM card to the network;

the second sending module 620 is further configured to send the IMEI and the multiple IMSIs to the equipment identify register;

the second receiving module 610 is further configured to receive a second verification result from the equipment identify register, the second verification result is generated by the equipment identify register after verifying the IMEI, and the IMEI and the multiple IMSIs are used for the equipment identify register to generate the mapping relation;

the determination module 630 is further configured to determine whether to allow the SIM card to reside in the network based on the second verification result; and the second sending module 620 is further configured to send the second verification result to the multi-SIM terminal.

In summary, in the network registration apparatus provided by the present disclosure, since there is a mapping relation stored in the EIR and the mapping relation is used for indicating a correspondence between an IMEI and multiple IMSIs, the management device can receive one IMEI and multiple IMSIs of the multiple SIM cards sent by the multi-SIM terminal when the multi-SIM terminal registers any one SIM card to the network, and send the IMEI and the multiple IMSIs to the EIR. In this case, the MME can determine to allow the SIM card to reside in the network based on the instruction of the EIR in determining that the received IMEI and multiple IMSIs are consistent with the stored mapping relation, so that when applying for one IMEI for the multi-SIM terminal, it can also be guaranteed that the network registration can be successfully performed by the multi-SIM terminal, thereby both preserving the remaining available IMEIs and reducing the costs of the multi-SIM terminal.

The IMSI of the currently-registered SIM card is indicated by the third field of the registration request, and the IMSIs of the remaining SIM cards are indicated by the fourth field of the registration request, which allows the currently-registered SIM card to be easily distinguished.

Figure 7:
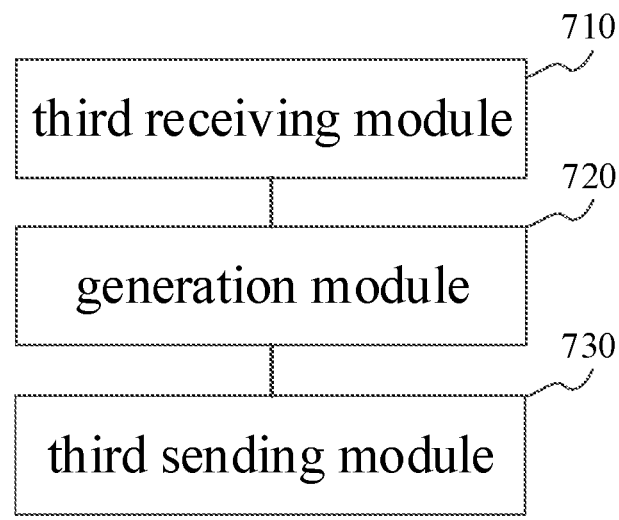
FIG. 7 illustrates a block diagram of a network registration apparatus according to an embodiment.

FIG. 7 illustrates a block diagram of a network registration apparatus according to an embodiment, the network registration apparatus being applied in the equipment identify register 104 shown in FIG. 1. As shown in FIG. 7, the network registration apparatus includes: a third receiving module 710, a generation module 720, and a third sending module 730.

The third receiving module 710 is configured to receive an IMEI and multiple IMSIs of multiple SIM cards from a management device, where the IMEI and the multiple IMSIs are sent by a multi-SIM terminal to the management device upon registering one SIM card to a network.

The generation module 720 is configured to verify whether the received IMEI and multiple IMSIs are consistent with a stored mapping relation and generate a first verification result, where the mapping relation is used for indicating a correspondence between an IMEI and multiple IMSIs.

The third sending module 730 is configured to send the first verification result to the management device, where the first verification result is used for indicating whether the SIM card is allowed to reside in the network.

In one possible implementation,
the third receiving module 710 is further configured to receive the IMEI and the multiple IMSIs from the management device, where the IMEI and the multiple IMSIs are sent by the multi-SIM terminal to the management device upon first registering the SIM card to the network;
the generation module 720 is further configured to verify the IMEI and generate a second verification result;
the generation module 720 is further configured to generate the mapping relation; and
the third sending module 730 is further configured to send the second verification result to the management device, where the second verification result is used for indicating whether the SIM card is allowed to reside in the network.

In summary, in the network registration apparatus provided by the present disclosure, since there is a mapping relation stored in the EIR and the mapping relation is used for indicating a correspondence between an IMEI and multiple IMSIs, the EIR can receive one IMEI and multiple IMSIs sent by the MME when the multi-SIM terminal registers any one SIM card to the network, and instruct the MME to allow the SIM card to reside in the network when it determines the received IMEI and multiple IMSIs are consistent with the stored mapping relation, so that when applying for one IMEI for the multi-SIM terminal, it can also be guaranteed that the network registration can be successfully performed by the multi-SIM terminal, thereby both preserving the remaining available IMEIs and reducing the costs of the multi-SIM terminal.

A multi-SIM terminal is provided by one embodiment of the present disclosure, which can implement the network registration method provided by this disclosure. The multi-SIM terminal includes a processor and a memory for storing executable instructions of the processor.

Here, the processor is configured to:
obtain, upon registering one SIM card of the multi-SIM terminal to a network, an IMEI and multiple IMSIs of multiple SIM cards in the multi-SIM terminal;
send the IMEI and the multiple IMSIs to a network device in the network; and
receive a first authentication result fed back from the network device, where the first authentication result is used for indicating whether the SIM card is allowed to reside in the network.

A management device is provided by one embodiment of the present disclosure, which can implement the network registration method provided by this disclosure. The management device includes a processor and a memory for storing executable instructions of the processor.

Here, the processor is configured to:
receive an IMEI and multiple IMSIs of multiple SIM cards from a multi-SIM terminal, where the IMEI and the multiple IMSIs are sent by the multi-SIM terminal upon registering one SIM card to a network;
send the IMEI and the multiple IMSIs to an equipment identify register;
receive a first verification result from the equipment identify register, where the first verification result is generated by the equipment identify register after verifying whether the IMEI and the multiple IMSIs are consistent with a stored mapping relation, and the mapping relation is used for indicating a correspondence between an IMEI and multiple IMSIs; determine whether to allow the SIM card to reside in the network based on the first verification result; and
send the first verification result to the multi-SIM terminal.

An equipment identify register is provided by one embodiment of the present disclosure, which can implement the network registration method provided by this disclosure. The equipment identify register includes a processor and a memory for storing executable instructions of the processor.

Here, the processor is configured to:
receive an IMEI and multiple IMSIs of multiple SIM cards from a management device, where the IMEI and the multiple IMSIs are sent by a multi-SIM terminal to the management device upon registering one SIM card to a network;
verify whether the received IMEI and multiple IMSIs are consistent with a stored mapping relation and generate a first verification result, where the mapping is used for indicating a correspondence between an IMEI and multiple IMSIs; and
send the first verification result to the management device, where the first verification result is used for indicating whether the SIM card is allowed to reside in the network.

Figure 8:
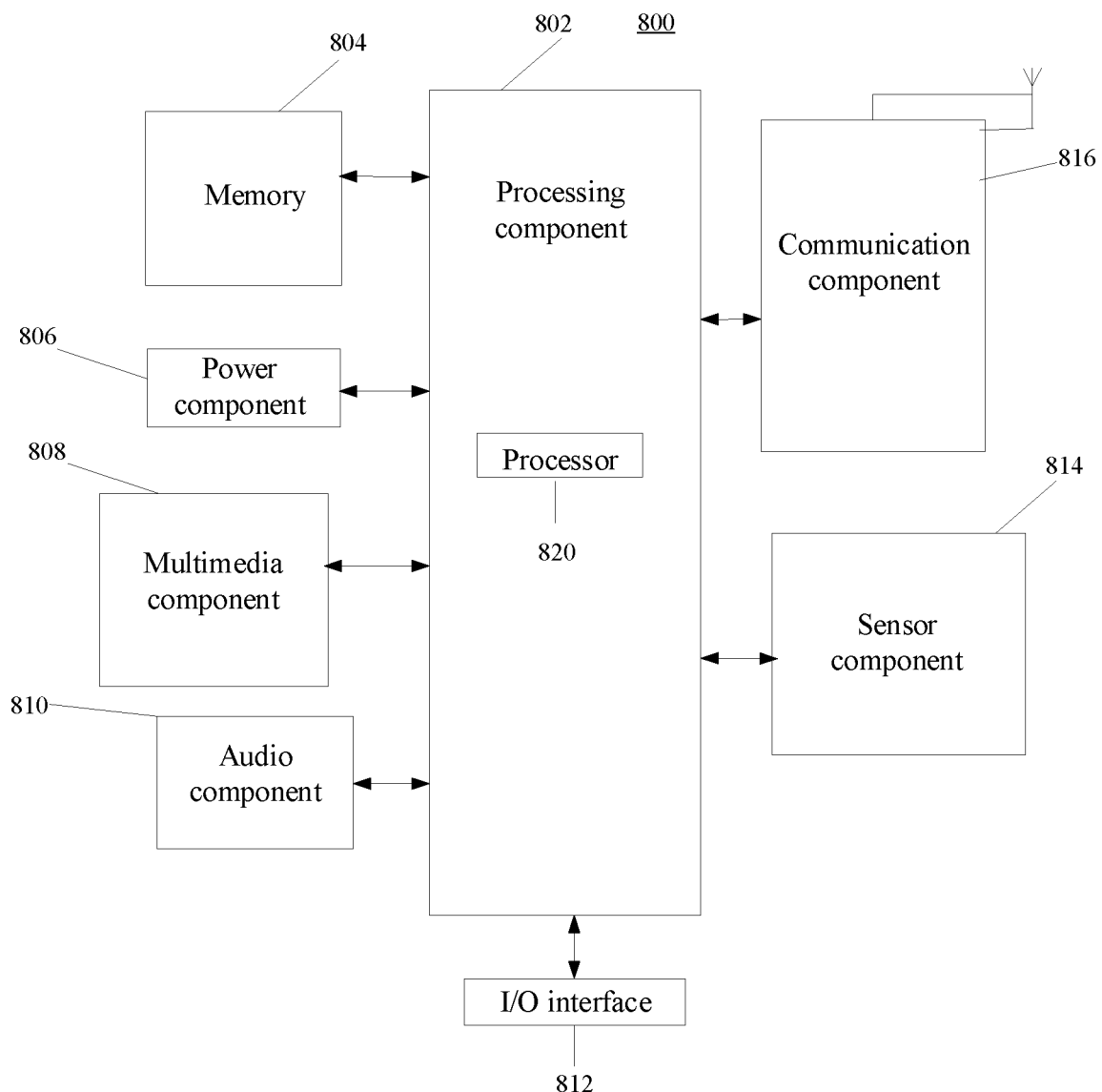
FIG. 8 illustrates a block diagram of a network registration device according to an embodiment.

FIG. 8 illustrates a block diagram of a device 800 for network registration according to an embodiment. For example, the device 800 may be a multi-SIM terminal.

Referring to FIG. 8, the device 800 may include one or more of the following components: processing component 802, memory 804, power component 806, multimedia component 808, audio component 810, interface 812 for input/output (I/O), sensor component 814, and communication component 816.

The processing component 802 is typically configured to control the overall operation of device 800, such as operations associated with display, telephone call, data communication camera operation, and recording operations. The processing component 802 may include one or more processors 820 to execute instructions to complete all or some of the steps of the method described above. In addition, the processing component 802 may include one or more modules that facilitate interaction between processing component 802 and other components. For example, processing component 802 may include a multimedia module to facilitate interaction between multimedia component 808 and processing component 802.

The memory 804 is configured to store various types of data to support operation at the device 800. Examples of such data include instructions for any application or method operating on the device 800, contact data, phonebook data, messages, images, videos, etc. The memory 804 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, Disk or CD-ROM.

The power component 806 provides power to various components of the device 800. The power component 806 may include a power management system, one or more power sources, and other components associated with generating, managing, and distributing power for the device 800.

The multimedia component 808 includes a screen that provides an output interface between the device 800 and a user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 808 includes a front-facing camera and/or a rear-facing camera. The front camera and/or rear camera may receive external multimedia data when the device 800 is in an operating mode, such as a shooting mode or a video mode. Each front camera and rear camera may be a fixed optical lens system or provided with a focal length and optical zoom capability.

The audio component 810 is configured to output and/or input an audio signal. For example, the audio component 810 includes a microphone (MIC) configured to receive external audio signals when the device 800 is in an operating mode, such as call mode, recording mode, and voice recognition mode. The received audio signal may be further stored in memory 804 or sent via communication component 816. In some embodiments, the audio component 810 further includes a speaker for outputting the audio signal.

The I/O interface 812 provides an interface between the processing component 802 and a peripheral interface module; the peripheral interface module may be a keypad, click wheel, button, etc. These buttons may include, but are not limited to: a home button, a volume button, a start button, and a lock button.

The sensor component 814 includes one or more sensors for providing a status assessment of various aspects of the device 800. For example, the sensor component 814 may detect an open/closed state of the device 800, the relative positioning of components, such as said components being the display and keypad of the device 800, and the sensor component 814 may also detect a change in position of the device 800 or a component of the device 800, the presence or absence of user contact with the device 800, orientation or acceleration/deceleration of the device 800 and a change in temperature of the device 800. The sensor component 814 may include a proximity sensor configured to detect the presence of a nearby object in the absence of any physical contact. The sensor component 814 may also include a light sensor, such as a CMOS or CCD image sensor, for use in an imaging application. In some embodiments, the sensor component 814 may also include an acceleration sensor, a gyroscope sensor, a magnetic sensor, a pressure sensor, or a temperature sensor.

The communication component 816 is configured to facilitate communication between the device 800 and other devices by wired or wireless means. The device 800 may access a wireless network based on a communication standard, such as WiFi, 2G or 3G, or a combination thereof. In an embodiment, the communication component 816 receives a broadcast signal or broadcast-related information from an external broadcast management system via a broadcast channel. In an embodiment, the communication component 816 further includes a near-field communication (NFC) module to facilitate short-range communication.

In embodiments, the device 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the methods described above.

In embodiments, there is also provided a non-transitory computer readable storage medium including instructions, such as a memory 804 including instructions, said instructions being executable by processor 820 of device 800 to accomplish the method described above. For example, the non-transitory computer readable storage medium may be ROM, random access memory (RAM), CD-ROM, magnetic tape, floppy disk, and optical data storage devices, among others.

A non-transitory computer readable storage medium that enables the mobile terminal to perform the above-described network registration method when the instructions in the storage medium are executed by the processor of the mobile terminal.

Figure 9:
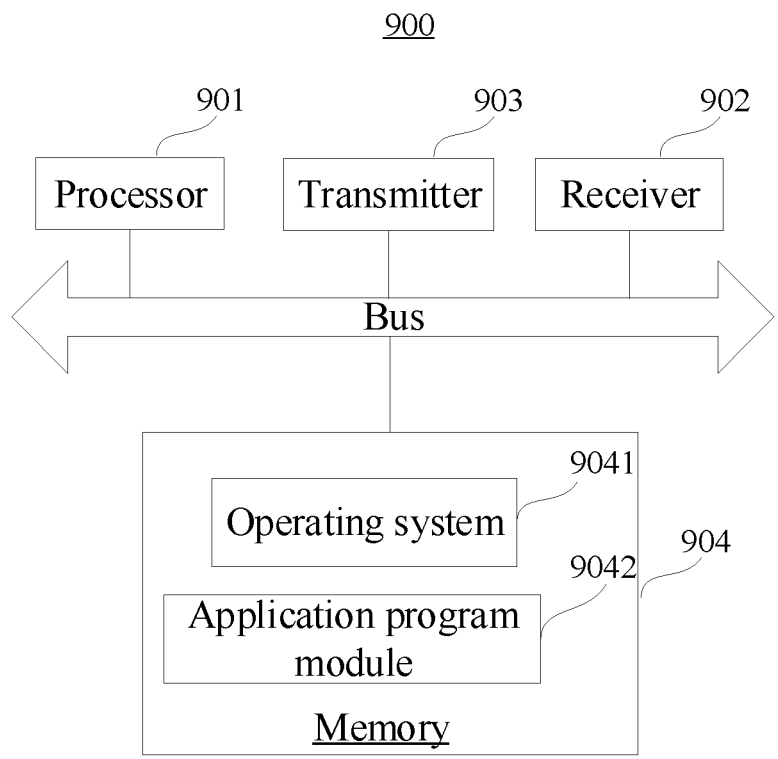
FIG. 9 illustrates a block diagram of a network registration device according to an embodiment.

FIG. 9 illustrates a block diagram of a network registration device 900 according to an embodiment. For example, the network registration device 900 may be a management device or an equipment identify register. As shown in FIG. 9, the network registration device 900 may include: a processor 901, a receiver 902, a transmitter 903, and a memory 904. The receiver 902, the transmitter 903, and the memory 904 are each connected to the processor 901 via a bus.

Here, the processor 901 includes one or more processing cores, and the processor 901 executes the network registration method provided by embodiments of the present disclosure by running the software program as well as the module. The memory 904 may be configured to store the software program as well as the module. Specifically, memory 904 may store operating system 9041, application program module 9042 required for at least one function. The receiver 902 is configured to receive communication data sent by other devices, and the transmitter 903 is configured to send communication data to other devices.

Figure 10:
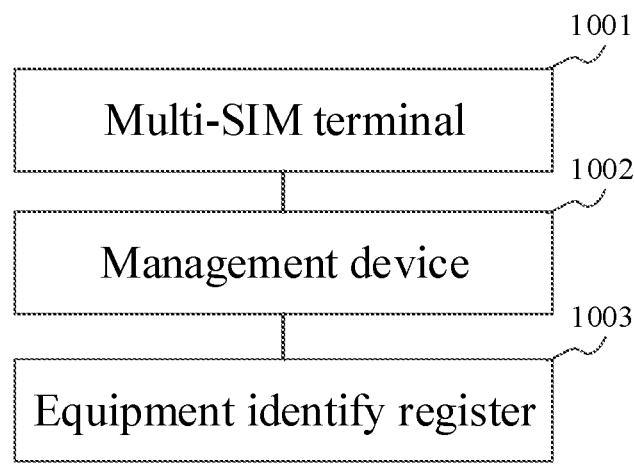
FIG. 10 illustrates a block diagram of a network registration system according to an embodiment.

FIG. 10 illustrates a block diagram of a network registration system according to an embodiment. As shown in FIG. 10, the network registration system includes a multi-SIM terminal 1001, a management device 1002, and an equipment identify register 1003.

The multi-SIM terminal 1001 is configured to perform the network registration method performed by the multi-SIM terminal in the embodiment shown in FIGS. 2 to 4.

The management device 1002 is configured to perform the network registration method performed by the network device in the embodiment shown in FIG. 2, or it is configured to perform the network registration method performed by the management device in the embodiment shown in FIGS. 3 to 4.

The equipment identify register 1003 is configured to perform the network registration method performed by the network device in the embodiment shown in FIG. 2, or it is configured to perform the network registration method performed by the equipment identify register in the embodiment shown in FIGS. 3 to 4.

An embodiment of the present disclosure provides a computer readable storage medium. At least one instruction, at least one program, code set or instruction set is stored in the storage medium, and the at least one instruction, the at least one program, the code set or instruction set is loaded and executed by the processor to implement the network registration method as described above.

The technical solution provided by the embodiments of the present disclosure may include the following beneficial effect.

Since there is a mapping relation stored in the network device and the mapping relation is used for indicating the correspondence between an IMEI and multiple IMSIs, the multi-SIM terminal can obtain the IMSIs of the multiple SIM cards in response to registering any one SIM card to the network, and send one IMEI and the multiple IMSIs to the network device. In this case, the network device can instruct to allow the SIM card to reside in the network when it determines that the received IMEI and multiple IMSIs are consistent with the stored mapping relation, so that when applying one IMEI for the multi-SIM terminal, it can also be guaranteed that the network registration can be successfully performed by the multi-SIM terminal, thereby both preserving the remaining available IMEIs and reducing the costs of the multi-SIM terminal.

Other embodiments of the present disclosure will easily come to the mind of one skilled in the art upon consideration of the specification and practice of the disclosure herein. The present application is intended to cover any variations, uses or adaptations of the present disclosure that follow the general principles of the present disclosure and include commonly known or customary technical means in the art that are not disclosed herein. The specification and embodiments are considered exemplary only, and the true scope and spirit of the present disclosure is indicated by the following claims.

It is to be understood that the present disclosure is not limited to the precise construction already described above and illustrated in the accompanying drawings, and that various modifications and changes may be made without departing from its scope. The scope of the present disclosure is limited only by the appended claims.

What is claimed is:

1. A method for network registration, comprising:
    obtaining, by a multi-SIM terminal upon registering a Subscriber Identification Module (SIM) card of the multi-SIM terminal to a network, an International Mobile Equipment Identity (IMEI) and multiple International Mobile Subscriber Identities (IMSIs) of multiple SIM cards in the multi-SIM terminal;
    sending, by the multi-SIM terminal, the IMEI and the multiple IMSIs to a network device in the network, wherein the IMEI and the multiple IMSIs are configured for the network device to generate an authentication result based on stored mapping relations, each of the mapping relations being configured for indicating a correspondence between an IMEI and multiple IMSIs; and
    receiving, by the multi-SIM terminal, the authentication result fed back from the network device, wherein the authentication result is used for indicating whether the SIM card is allowed to reside in the network.

2. The method of claim 1, wherein the network device comprises a management device, and the management device is a Mobility Management Entity (MME), and wherein sending, by the multi-SIM terminal, the multiple IMSIs to the network device in the network comprises:
    generating, by the multi-SIM terminal, an attach request, wherein the attach request carries the multiple IMSIs; and
    sending, by the multi-SIM terminal, the attach request to the management device.

3. The method of claim 2, wherein the attach request comprises a first field and a second field, the first field indicates an IMSI of currently-registered SIM card, and the second field indicates the IMSI of a SIM card other than the currently-registered SIM card.

4. The method of claim 1, wherein the network device comprises a management device, and the management device is an Access and Mobility Management Function (AMF), and wherein sending, by the multi-SIM terminal, the multiple IMSIs to the network device in the network comprises:
    generating, by the multi-SIM terminal, a registration request, wherein the registration request carries the multiple IMSIs; and
    sending, by the multi-SIM terminal, the registration request to the management device.

5. The method of claim 4, wherein the registration request comprises a third field and a fourth field, the third field indicates an IMSI of currently-registered SIM card, and the fourth field indicates the IMSI of a SIM card other than the currently-registered SIM card.

6. A method for network registration, comprising:
    receiving, by a network device in a network, an International Mobile Equipment Identity (IMEI) and multiple International Mobile Subscriber Identities (IMSIs) of multiple Subscriber Identification Module (SIM) cards from a multi-SIM terminal, wherein the IMEI and the multiple IMSIs are sent by the multi-SIM terminal upon registering one SIM card to the network;
    verifying, by the network device, whether the received IMEI and multiple IMSIs are consistent with a mapping relation stored in the network device, and generating a first authentication result, wherein the mapping relation is used for indicating a correspondence between an IMEI and multiple IMSIs, and the first authentication result is used for indicating whether the SIM card is allowed to reside in the network;
    determining, by the network device, whether to allow the SIM card to reside in the network based on the first authentication result; and
    sending, by the network device, the first authentication result to the multi-SIM terminal.

7. The method of claim 6, wherein the network device comprises a management device and an equipment identify register,
    wherein receiving, by the network device, the IMEI and the multiple IMSIs of the multiple SIM cards from the multi-SIM terminal comprises:

receiving, by the management device, the IMEI and the multiple IMSIs of the multiple SIM cards from the multi-SIM terminal;

wherein verifying, by the network device, whether the received IMEI and multiple IMSIs are consistent with the mapping relation stored in the network device and generating the first authentication result comprises:
sending, by the management device, the IMEI and the multiple IMSIs to the equipment identify register; and
verifying, by the equipment identify register, whether the received IMEI and multiple IMSIs are consistent with the mapping relation stored in the network device, and generating the first authentication result;

wherein determining, by the network device, whether to allow the SIM card to reside in the network based on the first authentication result comprises:
sending, by the equipment identify register, the first authentication result to the management device; and
determining, by the management device, whether to allow the SIM card to reside in the network based on the first authentication result; and wherein sending, by the network device, the first authentication result to the multi-SIM terminal comprises:
sending, by the management device, the first authentication result to the multi-SIM terminal.

8. The method of claim 7, wherein the management device is a Mobility Management Entity (MME), and wherein receiving, by the management device, the multiple IMSIs of the multiple SIM cards from the multi-SIM terminal comprises:
receiving, by the management device, an attach request from the multi-SIM terminal; and
obtaining, by the management device, the multiple IMSIs from the attach request.

9. The method of claim 8, wherein obtaining, by the management device, the multiple IMSIs from the attach request comprises:
reading, by the management device, a first field and a second field from the attach request;
obtaining, by the management device, an IMSI of currently-registered SIM card based on the first field, and obtaining the IMSI of a SIM card other than the currently-registered SIM card based on the second field.

10. The method of claim 7, wherein the management device is an Access and Mobility Management Function (AMF), wherein receiving, by the management device, the multiple IMSIs of the multiple SIM cards from the multi-SIM terminal comprises:
receiving, by the management device, a registration request from the multi-SIM terminal; and
obtaining, by the management device, the multiple IMSIs from the registration request.

11. The method of claim 10, wherein obtaining, by the management device, the multiple IMSIs from the registration request comprises:
reading, by the management device, a third field and a fourth field from the registration request; and
obtaining, by the management device, an IMSI of currently-registered SIM card based on the third field, and obtaining the IMSI of a SIM card other than the currently-registered SIM card based on the fourth field.

12. The method of claim 6, further comprising:
receiving, by the network device, the IMEI and the multiple IMSIs from the multi-SIM terminal, wherein the IMEI and the multiple IMSIs are sent by the multi-SIM terminal upon first registering the SIM card to the network;
verifying, by the network device, the IMEI and generating a second authentication result, wherein the second authentication result is used for indicating whether the SIM card is allowed to reside in the network;
generating, by the network device, the mapping relation based on the IMEI and the multiple IMSIs;
determine, by the network device, whether to allow the SIM card to reside in the network based on the second authentication result; and
sending, by the network device, the second authentication result to the multi-SIM terminal.

13. A multi-SIM terminal, comprising
one or more processors; and
a non-transitory computer-readable storage medium for storing instructions executable by the one or more processors, wherein the one or more processors are configured to implement the method of claim 1.

14. A network device, comprising:
one or more processors; and
a non-transitory computer-readable storage medium for storing instructions executable by the one or more processors, wherein the one or more processors are configured to either:
receive an International Mobile Equipment Identity (IMEI) and multiple International Mobile Subscriber Identities (IMSIs) of multiple Subscriber Identification Module (SIM) cards from a multi-SIM terminal, wherein the IMEI and the multiple IMSIs are sent by the multi-SIM terminal upon registering one SIM card to a network;
send the IMEI and the multiple IMSIs to an equipment identify register;
receive a first authentication result from the equipment identify register, wherein the first authentication result is generated by the equipment identify register after verifying whether the IMEI and the multiple IMSIs are consistent with a stored mapping relation, and the mapping relation is used for indicating a correspondence between an IMEI and multiple IMSIs;
determine whether to allow the SIM card to reside in the network based on the first authentication result; and
send the first authentication result to the multi-SIM terminal;
or
wherein the one or more processors are configured to:
receive an IMEI and multiple IMSIs of multiple SIM cards from a management device, wherein the IMEI and the multiple IMSIs are sent by a multi-SIM terminal to the management device upon registering one SIM card to a network;
verify whether the received IMEI and multiple IMSIs are consistent with a stored mapping relation and generate a first authentication result, wherein the mapping relation is used for indicating a correspondence between an IMEI and multiple IMSIs; and
send the first authentication result to the management device, wherein the first authentication result is used for indicating whether the SIM card is allowed to reside in the network.

15. A non-transitory computer readable storage medium, storing at least one instruction, at least one segment of a program, a code set or an instruction set, wherein:
the at least one instruction, the at least one segment of the program, the code set or the instruction set is loaded and executed by one or more processors to implement the network registration method of claim 1.

16. The multi-SIM terminal of claim 13, wherein the one or more processors are further configured to:
- generate an attach request, wherein the attach request carries the multiple IMSIs;
- send the attach request to a management device of the network device, wherein the management device is a Mobility Management Entity (MME).

17. The multi-SIM terminal of claim 16, wherein the attach request comprises a first field and a second field, the first field indicates an IMSI of currently-registered SIM card, and the second field indicates the IMSI of a SIM card other than the currently-registered SIM card.

18. The multi-SIM terminal of claim 13, wherein the one or more processors are further configured to:
- generate a registration request, wherein the registration request carries the multiple IMSIs; and
- send the registration request to a management device of the network device, wherein the management device is an Access and Mobility Management Function (AMF).

19. The multi-SIM terminal of claim 18, wherein the registration request comprises a third field and a fourth field, the third field indicates an IMSI of currently-registered SIM card, and the fourth field indicates the IMSI of a SIM card other than the currently-registered SIM card.

* * * * *